Figure 1:
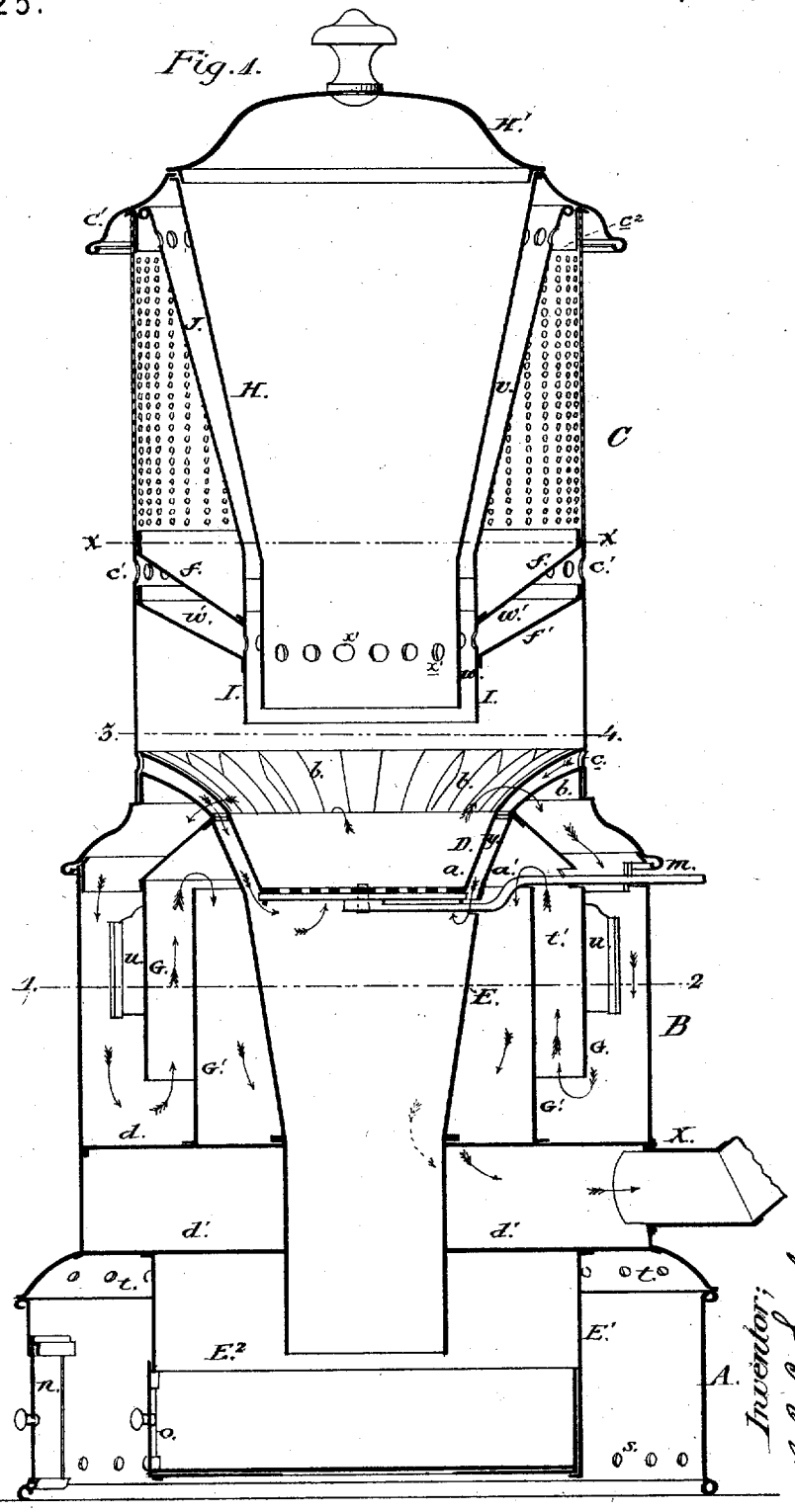
Figure 2:
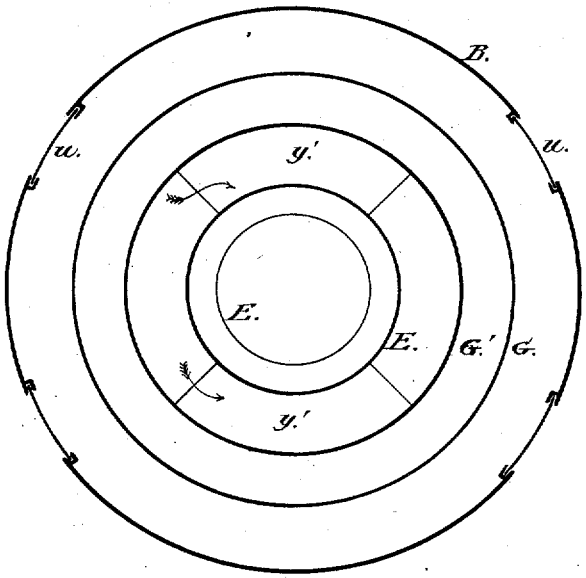
Figure 3:
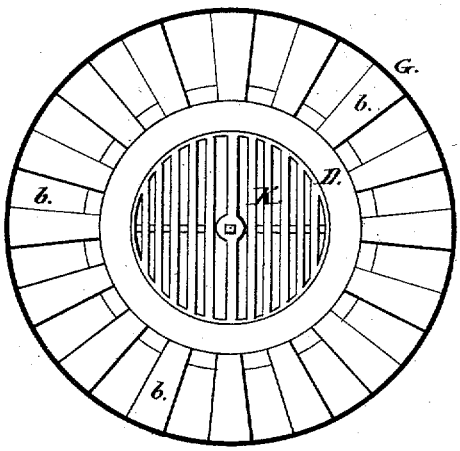

2 Sheets--Sheet 1.

J. Q. C. SEARLE.

Base-Burning Stoves.

No. 5,825.

Reissued April 7, 1874.

Witnesses.
M. Gardner
W. H. Thornton

Inventor;
J. Q. C. Searle
By his attys.
Horton & Austin

AM. PHOTO-LITHOGRAPHIC Co. N. Y. (OSBORNE'S PROCESS.)

2 Sheets--Sheet 2.

J. Q. C. SEARLE.

Base-Burning Stoves.

No. 5,825. Reissued April 7, 1874.

Attest:
M. Gardner.
H. W. Throckmorton.

Inventor:
J. Q. C. Searle
By his attys
Howson and Son

AM. PHOTO-LITHOGRAPHIC Co. N. Y. (OSBORNE'S PROCESS.)

UNITED STATES PATENT OFFICE.

J. Q. C. SEARLE, OF CINCINNATI, OHIO, ASSIGNOR TO JULIA E. SEARLE.

IMPROVEMENT IN BASE-BURNING STOVES.

Specification forming part of Letters Patent No. 89,248, dated April 20, 1869; reissue No. 5,825, dated April 7, 1874; application filed September 27, 1872.

*To all whom it may concern:*

Be it known that I, J. Q. C. SEARLE, formerly of Topeka, Kansas, but now residing in Cincinnati, Ohio, have invented certain Improvements in Base-Burning Stoves, of which the following is a specification:

My invention relates to stoves or heaters in which the fuel is contained in a magazine or feeder placed above the fire-pot; and my invention consists of an arrangement of plates and air-passages, fully described hereafter, whereby the contents of the magazine are prevented from becoming unduly heated.

A is the base, B the body, and D the fire-pot, of the stove, a tube, E, inclosing and extending downward from the fire-pot, through horizontal plates *d d'*, to a point above the ash-pan. This tube is inclosed by deflecting plates G G', which form a reverberating flue, *t'*, communicating, through openings *y'*, with the chamber between the plates *d d'* and with the chimney. The walls of the fire-pot D are hollow, and communicate with hollow arms *b*, extending radially to the cylinder C, which is perforated, so that air can pass through the arms and chamber *y* to the tube E below the grate.

As I make no claim herein to any of the peculiar features in that part of the heater above described, a more detailed description of such portion will not be necessary.

Above the fire-pot, within the cylinder C, is suspended a magazine or feeder, H, closed at the top by a cap, H', and having, near the lower end, perforations *x'*. From the mouth of the feeder to the cylinder extends a shield, I *f'*, and between the shield and the feeder is a passage, *w*, through which air (admitted to the space above the shield through openings in the cylinder) may pass to the interior of the feeder. A tube, J, surrounds the feeder, forming an intervening chamber, *v*, communicating with the passage *w*, and at the upper end of the tube are openings $c^2$ for the admission of air to the said chamber.

Where it is desired to prevent the radiation of heat from the shield, a second shield or plate, *f*, may be arranged above the first, extending from the feeder to the cylinder, and the entire body of the latter above the shields may be perforated, as shown, so as to allow the air to circulate freely in contact with the feeder. The air which is admitted to the mouth of the feeder through the passages or openings *w x'* tends to keep the fuel above the mouth from heating and swelling, while, as it passes downward, it insures a thorough combustion of the fuel at and below the mouth, so that it cannot become coked and wedged in the feeder, the downward draft preventing the heated gases from passing upward into the magazine.

The shield I *f'* covers what may properly be termed the "combustion-chamber," and, while it helps to form the passage *w* for conducting an ample supply of cool air to the mouth of the feeder, it most effectually prevents the passage of heated gases in contact with any part of the exterior surface of the feeder.

Should it be desired, the chamber *v*, instead of serving as an air-passage, may be filled with powdered plaster or other non-conducting material, and the cylinder or casing C may, instead of being perforated throughout its whole extent, have only such openings as are necessary to admit air to the passages.

It will be apparent that my improvements may be applied to heaters of various forms, wherever it is necessary, to prevent the heated gases from coming in contact with and heating the magazine.

I do not here claim the casing surrounding and concealing the magazine, and perforated to allow the air to pass freely, as it may form the subject of a separate patent for a design; but

I claim—

1. The combination in a heater, of a magazine, an imperforate shield, I *f'*, surrounding the lower end of the magazine, and an opening or passage, *w*, through which the air may pass between the shield and magazine, as and for the purpose set forth.

2. The combination of the magazine H, having perforations *x'* near its mouth, and a shield, I *f'*, above which air can pass to the said perforations, substantially as and for the purpose specified.

In testimony whereof I have signed my name to this specification in the presence of two subscribing witnesses.

J. Q. C. SEARLE.

Witnesses:

F. DANM,

ED. M. SPANGENBURG.